United States Patent
Luthi

[15] 3,680,708
[45] Aug. 1, 1972

[54] ROTARY DRUM FILTER
[72] Inventor: Oscar Luthi, Nashua, N.H.
[73] Assignee: Improved Machinery Inc., Nashua, N.H.
[22] Filed: Sept. 10, 1970
[21] Appl. No.: 71,073

[52] U.S. Cl. .................................................210/404
[51] Int. Cl. ............................................B01d 33/06
[58] Field of Search...............210/479, 492, 399–407
[56] References Cited

UNITED STATES PATENTS

| | | | |
|---|---|---|---|
| 1,470,463 | 10/1923 | Manning | 210/399 X |
| 1,949,998 | 3/1934 | French | 210/402 X |
| 3,327,863 | 6/1967 | Turner, Jr. | 210/404 X |
| 3,517,818 | 6/1970 | Luthi | 210/404 X |
| 3,306,457 | 2/1967 | Purnam | 210/404 X |

Primary Examiner—Reuben Friedman
Assistant Examiner—T. A. Granger
Attorney—Carl R. Horten, David W. Tibbott and Robert R. Paquin

[57] ABSTRACT

A rotary drum filter comprising a generally annular rotatably driven drum having filtrate compartments which extend generally longitudinally along the drum outer circumference. The filtrate compartments are overlaid by cover elements which have filtrate passages on their outer peripheries inwardly of a foraminous filter medium; and the filtrate passages are communicated with the filtrate compartments by drainage openings in an edge portion of each cover element at intervals along the length of the drum. The drainage openings are constructed to discharge filtrate to their respective communicating filtrate compartments in a direction at least generally towards the discharge ends of the latter whereby the discharging filtrate has a substantial velocity component in such direction.

16 Claims, 5 Drawing Figures

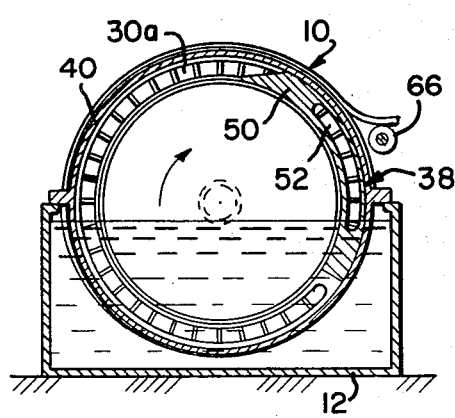
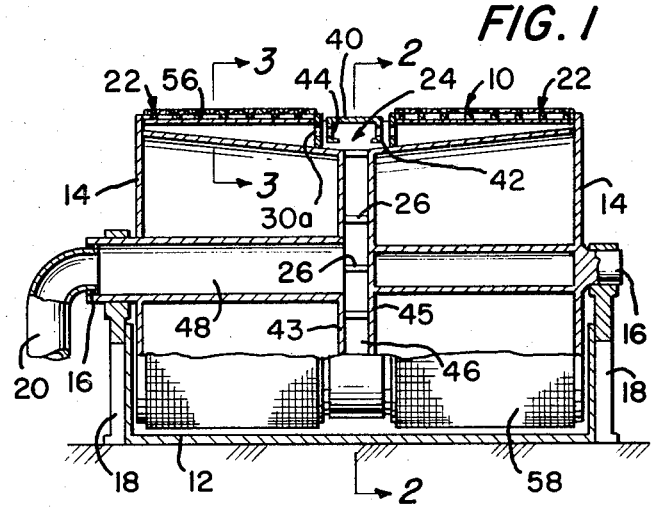
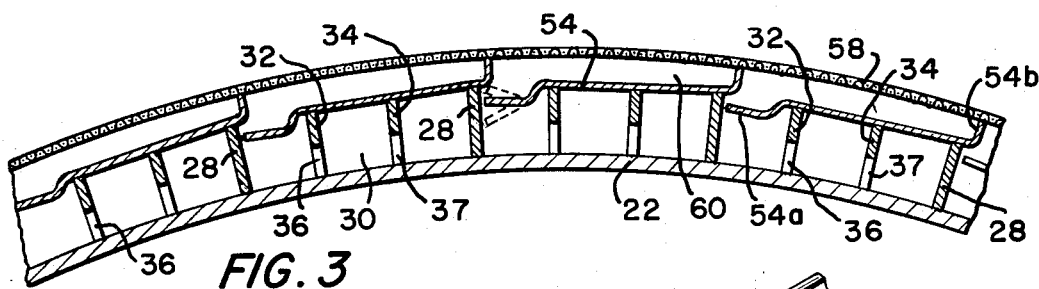
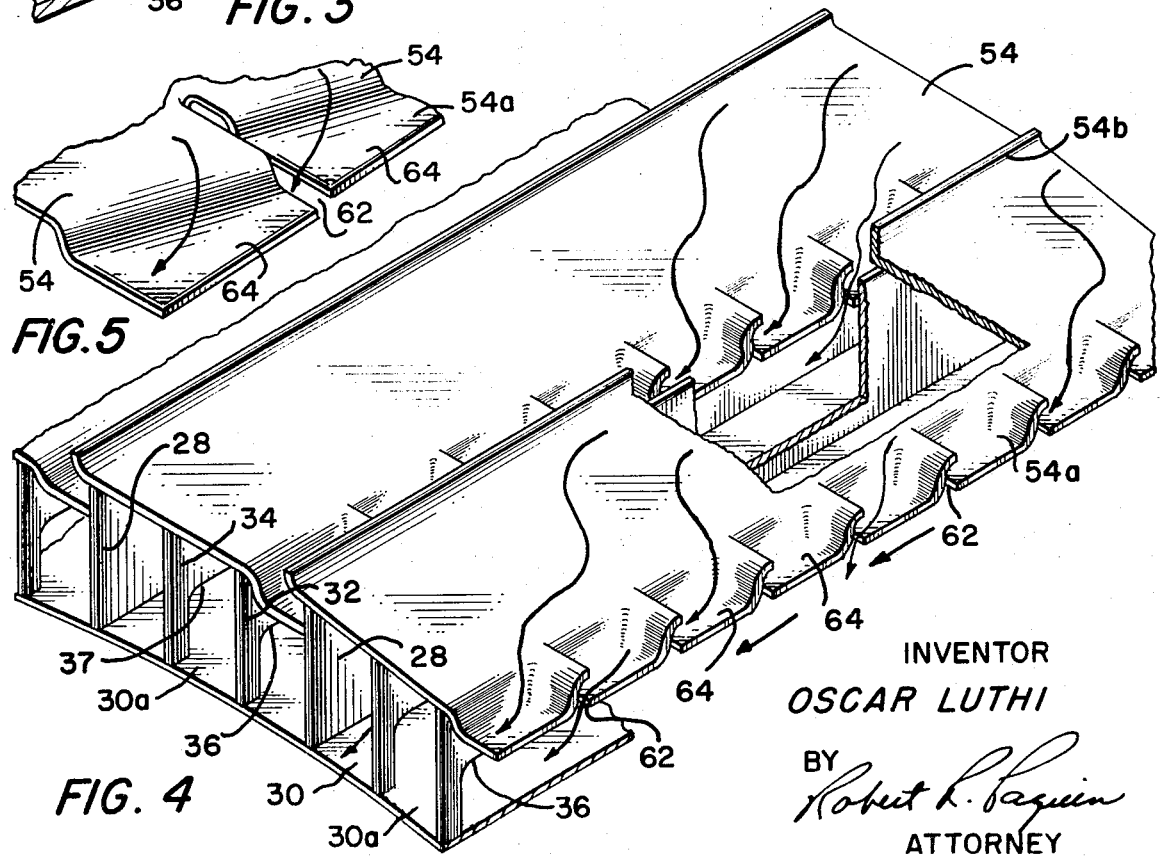
INVENTOR
OSCAR LUTHI
BY Robert L. Paquin
ATTORNEY

ROTARY DRUM FILTER

The present invention relates to filtering apparatus and more particularly to rotary drum filters of the type for filtering a slurry such as, for example, pulp stock for the manufacture of paper.

Conventionally, rotary drum vacuum filters have been constructed to include a generally annular rotatably driven drum having filtrate compartments extending generally longitudinally along its outer circumference, and cover elements overlaying the filtrate compartments spaced one from another circumferentially of the drum to permit filtrate drainage to the compartments between the cover elements. Also, these conventional filters have been provided with filtrate passages on the outer circumferences of the cover elements inwardly of a foraminous filter medium which may be supported by one longitudinal edge of each of the cover elements. Such a filter is, for example, described in U.S. Pat. No. 3,306,460, issued Feb. 28, 1967, to Oscar Luthi and assigned to the assignee of the present invention.

During the operation of these conventional filters, filtrate flowing inwardly through the filter medium into the filtrate passages is directed by the cover elements in the circumferential direction of the drum to the filtrate compartments which in turn direct the filtrate longitudinally of the drum. It has been discovered that during this operation, and particularly when such a filter is operating at a relatively high flow rate, a pressure differential occurs between the discharge ends of the filtrate compartments and the other or remote ends of such compartments. More specifically, the subatmospheric pressure or vacuum applied to the remote ends of the compartments may be substantially lower than that applied to the compartment discharge ends, thereby resulting in a correspondingly lower rate of filtrate flow through the filter medium adjacent such remote ends and less fiber deposit on the filter medium at such location. This nonuniformity in fiber build-up on the filter medium is detrimental to filter efficiency and, particularly in extreme cases, can permit excessive introduction of air which undesirably lessens the effective operating subatmospheric pressure or vacuum of the filter. It is believed that this pressure differential is primarily due to fluid friction in the compartments and the energy necessary to accelerate the filtrate, entering the compartments circumferentially of the drum with no velocity longitudinally of the compartments, towards the discharge ends of the compartments.

An object of the present invention is to provide a new and improved rotary drum filter which is particularly constructed and arranged to substantially minimize the aforesaid pressure differentials in the filtrate compartments.

Another object of the invention is to provide a new and improved rotary drum filter which is particularly constructed and arranged whereby the filtrate is discharged to the filtrate compartments with a substantial velocity component in the longitudinal direction of the compartments.

Another object is to provide a new and improved rotary drum filter which is particularly constructed and arranged to provide these beneficial results in a relatively simple and economical manner.

These objects, and other objects and advantages of the invention which will be apparent from the following description taken in connection with the accompanying drawings, may be attained by the construction of a drum structure for a rotary drum filter to, in general, comprise a generally annular drum, a plurality of rib elements extending generally longitudinally along the circumference of said drum and circumferentially spaced around the drum to define a plurality of filtrate compartments extending generally longitudinally along the drum circumference, a plurality of cover elements mounted generally longitudinally and circumferentially around the drum laterally spaced from the drum circumference by the filtrate compartments, a foraminous filter medium overlying the cover elements and spaced therefrom to provide filtrate passages intermediate the cover elements and the filter medium, the cover elements being provided with filtrate drainage openings connecting the filtrate passages with the filtrate compartments for supplying filtrate from the former to the latter, and louver means adjacent the drainage openings for causing filtrate draining through the drainage openings to be discharged to the filtrate compartments in a direction at least generally longitudinally of the filtrate compartments.

Referring to the drawings:

FIG. 1 is an elevational sectional view of a rotary drum filter constructed in accordance with the present invention;

FIG. 2 is an elevational sectional view of the filter taken on line 2—2 of FIG. 1, looking in the direction of the arrows;

FIG. 3 is an enlarged, fragmentary elevational sectional view taken on line 3—3 of FIG. 1, looking in the direction of the arrows;

FIG. 4 is an enlarged, fragmentary perspective view, partially broken away and in section, illustrating the cover element and filtrate compartments of the filter shown in FIGS. 1 through 3, looking from the discharge ends of the compartments; and FIG. 5 is an enlarged perspective view fragmentarily illustrating another filter constructed in accordance with the invention.

Referring more particularly to the drawings wherein similar reference characters designate corresponding parts throughout the several views, the illustrated rotary drum filter comprises a generally annular rotatably driven drum or drum structure designated generally as 10 which is partially submerged in a tank or vat 12 containing a slurry including pulp fibers. The drum 10 is formed to include a pair of end closure plates 14 each connected to a trunnion 16, which serves to rotatably support the drum 10 on a bearing pedestal 18. One of the trunnions 16 is hollow and has the upper end of a barometric leg or vacuum pipe 20 extending thereinto, such barometric leg 20 during the operation of the drum filter operating in the conventional manner to drain filtrate and create and apply a subatmospheric pressure or vacuum.

As illustrated, the drum 10 is constructed to include two identical coaxial annular drum halves 22 spaced one from another by an annular space or channel 24 adjacent the longitudinal mid-point of the drum 10. The drum halves 22 are connected to one another by suitable conventional bracing elements such as the tie elements 26, to be conjointly rotatable and preferably both along their outer circumferences slope downwardly towards the space or channel 24 to facilitate filtrate drainage thereto. However, the present invention is not limited to filters in which the drum is divided into halves or other sections but rather, as will become readily apparent from the following description, is equally applicable to filters wherein the drum is undivided in which event the entire drum could, for example, be constructed similarly to a single one of the illustrated drum halves 22.

A plurality of imperforate laterally upstanding rib elements 28 are rigidly mounted on the outer circumference of each drum half 22 to extend generally longitudinally along such outer circumference substantially throughout the length of the drum half 22. The imperforate rib elements 28 of each drum half 22 are circumferentially spaced around the drum half 22 to cause circumferentially adjacent elements 28 to form opposing side walls of filtrate compartments 30 which extend generally longitudinally along the outer circumference of the drum half 22 substantially throughout its extent; and intermediate each two circumferentially adjacent imperforate rib elements 28 there are provided other rib elements 32, 34 which have openings 36, 37, respectively, therethrough communicating the portions of the filtrate compartments 30 on opposite sides thereof. The filtrate compartments 30 are each closed at one end by an end closure plate 14, closed along their inner periphery by the outer circumference of the respective drum half 22, and have juxtaposed discharge ends 30a open to communication with the annular space 24 between the drum halves 22.

As illustrated, a stationary or non-rotatable valving assembly designated generally as 38 is located in the space 24. The valving assembly 38 is constructed such that, although permitting the application of subatmospheric pressure or vacuum to the filtrate compartments 30 through the compartment ends 30a during the major portion of the drum rotation, it prevents such application of subatmospheric pressure from about the 1 o'clock position (as viewed in FIG. 2) through about the 4 o'clock position (as viewed in FIG. 2). The valving assembly 38 is shown as being held against rotation by means externally of the drum 10, but may be alternatively held stationary in any other conventional manner such as, for example, by means internally of the drum 10. Furthermore, alternatively to the illustrated valving assembly 38 the filter could, if desired, be provided with a valve which is located at one end of the drum and connected to the compartment ends 30a by a plurality of separate pipes. This latter form of valve is, for example, described in U.S. Pat. No. 3,363,774, issued Jan. 16, 1968, to Oscar Luthi and assigned to the assignee of the present invention.

The illustrated valving assembly 38 comprises an arcuate outer wall 40 which surrounds the drum 10 and throughout the approximately 270° arc between about the 4 o'clock position of FIG. 2 and about the 1 o'clock position of FIG. 2 has integral side walls 42 provided with openings 44 communicating with the open ends 30a of the compartments 30 of each drum half 22. The inner periphery of the valving assembly 38 is open throughout such approximately 270° arc; and the drum 10 is provided with spaced discs 43, 45 bounding the opposite sides of a fluid passage 46 communicating with the open inner periphery of the valving assembly 38 throughout this 270° arcuate length. The fluid passage 46, in turn, is connected through the channel 48 in a hollow trunnion 16 to the barometric leg 20 to thereby communicate the barometric leg 20 with the aforesaid 270° arcuate length of the valving assembly 38.

The valving assembly 38 from the aforesaid about 1 o'clock position through the aforesaid about 4 o'clock position is closed along its inner periphery by an arcuate wall which prevents communication of the filtrate compartments 30 with the barometric leg 20. Also, this latter length of the valving assembly 38 is closed at its opposite ends by transversely extending end closure walls (not shown) and along its opposite sides has side walls 50, one of which is shown in FIG. 2. The side walls 50 are each provided with an elongated opening 52 therethrough; and the outer wall 40 is in the conventional manner provided with openings (not shown) permitting air from the initially submerging filtrate compartments 30 to escape to the atmosphere through the elongated openings 52 and such openings in the wall 40. Further details of the construction of the illustrated valving assembly 38 may be obtained from the aforesaid U.S. Pat. No. 3,306,460.

A plurality of cover elements or plates 54 are rigidly mounted on the radially outer ends of the rib elements 28, 32, 34 to extend generally longitudinally and circumferentially around the outer circumference of the drum 10 radially spaced outwardly from such outer circumference by the filtrate compartments 30 of which they bound the outer peripheries. The cover elements 54 of each drum half 22 are of sufficient dimension in the circumferential direction of the drum 10 to prevent substantial filtrate flow to the therebelow filtrate compartments 30 between circumferentially adjacent ones of the cover elements 54 and each longitudinally extend the length of their respective drum half 22. The cover elements 54 each have trailing and leading longitudinal edge portions 54a and 54b, respectively, extending generally in the longitudinal direction of the drum 10, the edge portion 54b of each cover element 54, as shown in FIGS. 3 and 4, being bent outwardly from the drum 10 at, for example, a 90° angle.

Channel or division strips 56 may be provided on the outer circumference of each cover element 54, such channel strips 56 extending generally circumferentially of the drum 10 and being spaced by therebetween filtrate passages or channels 60 which similarly extend in the generally circumferential direction of the drum 10. The channel strips 56 may, if desired, each have an end affixed in a groove (not shown) in the outwardly extending edge portion 54b of a cover element 54. A foraminous sheet filter medium 58 is wrapped around each drum half 22, the filter medium 58 of each drum half 22 being, for example, affixed to the outer edges of the division strips 56 and the outwardly extending edge portions 54b of the cover elements 54.

The edge portion 54a of each cover element 54 (i.e., the trailing edge portion of each cover element 54) is at intervals along its length provided with aligned drainage openings 62 communicating the underlying filtrate passages with an overlaid filtrate compartment 30 for draining filtrate from such filtrate passages 60 to such filtrate compartment 30. The drainage openings 62 are each constructed to longitudinally extend generally transversely to the respective connected filtrate compartment 30 and discharge filtrate to such compartment 30 in a direction at least generally towards the discharge end 30a of the latter. In this manner, the discharging filtrate is thereby provided with a substantial velocity component in the longitudinal direction of the filtrate compartment 30 towards its discharge end 30a.

More particularly, as best illustrated in FIG. 4, the edge portion 54a of each cover element 54 is at intervals along its length provided with portions 64 laterally offset or recessed inwardly towards the therebelow filtrate compartment 30; and the drainage openings 62 are each located at the end of a respective recessed portion 64 most adjacent to the discharge end 30a of the communicating filtrate compartment 30. Resultantly, all of the drainage openings 62 in each cover element 54 (excepting the first one in each cover element 54) are formed generally of slot-like louvered configuration. The recessed portions 64 slope downwardly towards their respective drainage openings 62 and are adjustable by bending to vary the flow volumes of their respective drainage openings 62, such adjustment of one of the recessed portions 64 being depicted by broken lines in FIG. 3.

Also, as shown in FIG. 5, the recessed portions 64 may, if desired, each gradually widen as they extend towards their respective drainage openings 62.

In operation, the drum 10 is rotatably driven in the clock-wise direction, as viewed in FIG. 2, to successively drive the filtrate compartments 30 under the level of the slurry in the vat 12 for filter cake accretion and then above such level for drying of the cake and removal of the accumulated cake from the filter medium 58 by doctor means (not shown) generally at the location of the roller 66 during the initial submerging of the filtrate compartments 30 into the slurry, filter cake accretion is effected without the assistance of the subatmospheric pressure but air in the initially submerging filtrate compartments 30 is permitted to escape to the atmosphere. Below the lowermost ends of the walls 50 subatmospheric pressure is applied to the filtrate compartments 30 through their ends 30a and additional filter cake is accumulated on the filter medium 58 due to this application of subatmospheric pressure. The subatmospheric pressure continues to be applied to the compartments 30 through their open ends 30a as the compartments 30 rotate above the level of the slurry and the accumulated filter cake is thereby dried. The subatmospheric pressure is cut off from the compartments 30 as they rotate to the upper end of the wall 50 where the dried accumulated filter cake is removed from the filter medium preparatory to the commencement of another filter cycle.

Throughout the drainage of filtrate through the filtrate compartments 30 due to the application of subatmospheric pressure, the filtrate flow is as schematically depicted by the arrows in FIG. 4. More particularly, the filtrate flows inwardly through the filter medium 58 onto the outer circumference of the cover elements 54 and thence flows circumferentially across the cover elements 54 to the recessed portions 64 at the edge portions 54a. The recessed portions 64 direct this filtrate to the drainage openings 62 which discharge the filtrate into the filtrate compartments 30 in a direction generally towards the discharge ends 30a. Thus, the filtrate is discharged by the drainage openings 62 with a substantial velocity component in the longitudinal direction of the filtrate compartments 30 towards the discharge ends 30a and the beforedescribed objects are resultantly attained.

It will be understood that, although only one embodiment of the invention has been illustrated and specifically hereinbefore described, the invention is not limited merely to this single embodiment but rather includes other embodiments and variations within the scope of the following claims.

Having thus described my invention, I claim:

1. A drum structure for a rotary drum filter, comprising a generally annular rotatable drum, a plurality of rib elements extending generally longitudinally along the circumference of said drum and circumferentially spaced around said drum to define a plurality of filtrate compartments extending generally longitudinally along the drum circumference, a plurality of cover elements mounted generally longitudinally and circumferentially around said drum radially spaced from the drum circumference by said filtrate compartments, a foraminous filter medium overlying said cover elements and spaced from therefrom to provide filtrate passages intermediate said cover elements and said filter medium, said cover elements being provided with filtrate drainage openings connecting said filtrate passages with said filtrate compartments for draining filtrate from said filtrate passages to said filtrate compartments, and louver means adjacent said drainage openings for causing filtrate draining through said drainage openings to be discharged to said filtrate compartments in a direction at least generally longitudinally of said filtrate compartments.

2. A drum structure according to claim 1, wherein said louver means are unitary with said cover elements and slope inwardly from said cover elements into said filtrate compartments.

3. A drum structure according to claim 2, wherein said drainage openings are of generally slot-like configuration.

4. A drum structure according to claim 2, wherein the drainage openings of each cover element are at least generally aligned in the longitudinal direction of said drum.

5. A drum structure for a rotary drum filter, comprising a generally annular rotatable drum, a plurality of generally upstanding rib elements extending generally longitudinally along the outer circumference of said drum and circumferentially spaced around said drum one from another to define a plurality of filtrate compartments extending generally longitudinally along the outer circumference of said drum, a plurality of cover elements mounted generally longitudinally and circumferentially around said drum radially spaced outwardly from the outer circumference of said drum by said filtrate compartments, a foraminous filter medium overlying said cover elements and spaced outwardly therefrom to provide filtrate passages intermediate said filter medium and the outer circumferences of said cover elements, said cover elements being provided at intervals along their lengths with drainage openings communicating said filtrate passages with said filtrate compartments for draining filtrate from said filtrate passages to said filtrate compartments and said filtrate compartments having discharge ends at which the filtrate is discharged therefrom, and louvers adjacent said drainage openings for causing filtrate draining through said drainage openings to said filtrate compartments to be discharged to said filtrate compartments in a direction at least generally towards said discharge ends of said filtrate compartments.

6. A drum structure according to claim 5, wherein said louvers are integral with said cover elements.

7. A drum structure according to claim 5, wherein said louvers comprise portions of said cover elements recessed into said filtrate compartments and said drainage openings are located adjacent the end of their respective recessed portions most adjacent to the discharge end of the communicating filtrate compartment.

8. A drum structure according to claim 5, wherein said louvers comprise portions of each cover element laterally offset from the main portion of the cover element, and said drainage openings are each located adjacent the ends of their offset portions most adjacent to the discharge end of the communicating filtrate compartment.

9. A drum structure according to claim 5, wherein the drainage openings of each cover element are generally aligned along an edge portion of the cover element.

10. A drum structure for a rotary drum filter, comprising a generally annular rotatable drum, a plurality of generally laterally upstanding rib elements extending generally longitudinally along the outer circumference of said drum and circumferentially spaced around said drum to define a plurality of filtrate compartments extending generally longitudinally along the outer circumference of said drum substantially throughout its extent, a plurality of cover elements mounted on said rib elements overlying the outer circumference of said drum and radially spaced outwardly from the drum outer circumference by said filtrate compartments, a foraminous sheet filter medium overlying said cover elements and radially outwardly spaced therefrom by drainage passages between said cover elements and said filter medium, each said cover element having an edge portion generally in the longitudinal direction of said drum which overlies a portion of a filtrate compartment, said edge portion of each said cover element at intervals along its length having transversely extending drainage openings communicating an overlying filtrate passage with an overlaid filtrate compartment for draining filtrate from such filtrate passage to such filtrate compartments, said filtrate compartments having discharge ends at which the filtrate is discharged therefrom, and said cover elements including louvers adjacent said drainage openings for causing filtrate draining through said drainage openings to be discharged thereby in a direction towards said discharge ends of said filtrate compartments.

11. A drum structure according to claim 10, wherein each said cover element at intervals along the length of said edge portion is laterally offset towards a filtrate compartment to provide said louvers, and said drainage openings are each located at the end of their respective offset portions most adjacent to the discharge end of the communicating filtrate compartment.

12. A drum structure according to claim 11, wherein such offset portions are adjustable to vary the flow volumes of said drainage openings.

13. A drum structure according to claim 11, wherein said cover elements cooperate to prevent substantial filtrate flow from said filtrate passages to said filtrate compartments other than through said drainage openings.

14. A drum structure according to claim 10, wherein said drainage openings are provided in the corresponding edge portion of each cover element.

15. A drum structure according to claim 11, wherein said ends of the offset portions are wider than the other ends thereof.

16. A drum structure according to claim 11, wherein said offset portions of said cover elements each gradually widen as they extend towards their said ends.

* * * * *